No. 802,722. PATENTED OCT. 24, 1905.
H. D. WILSON.
COTTON PLANTER AND FERTILIZER DISTRIBUTER.
APPLICATION FILED MAR. 31, 1905.
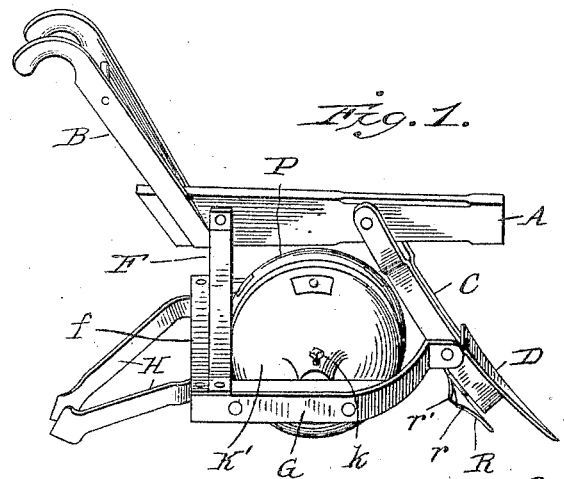
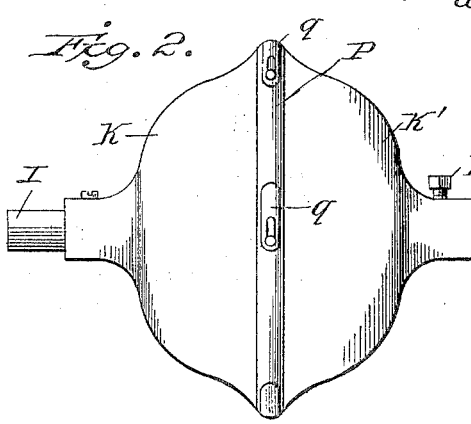 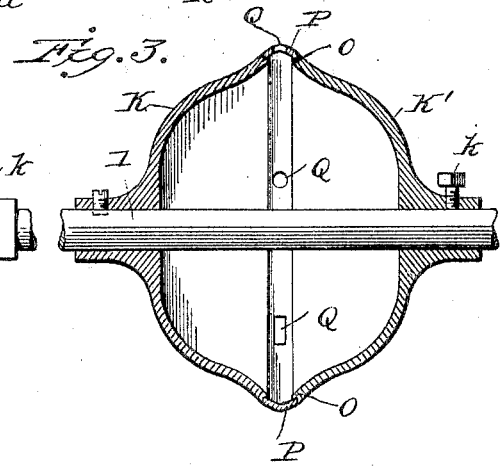
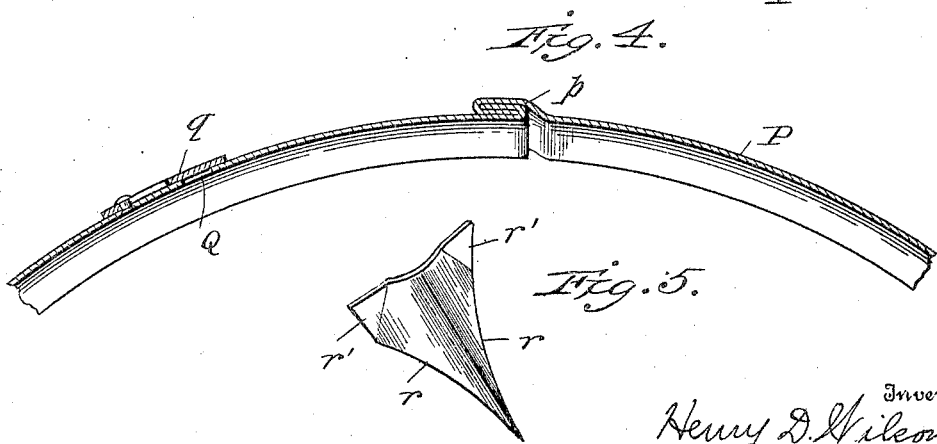
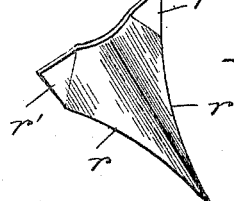
Witnesses
Edwin L. Yewell
Melville B. Church
Inventor
Henry D. Wilson,
By Church & Church
his Attorneys

UNITED STATES PATENT OFFICE.

HENRY D. WILSON, OF BAINBRIDGE, GEORGIA.

COTTON-PLANTER AND FERTILIZER-DISTRIBUTER.

No. 802,722.      Specification of Letters Patent.      Patented Oct. 24, 1905.

Application filed March 31, 1905. Serial No. 253,118.

*To all whom it may concern:*

Be it known that I, HENRY D. WILSON, a citizen of the United States, residing at Bainbridge, in the county of Decatur and State of Georgia, have invented certain new and useful Improvements in Cotton-Planters and Fertilizer-Distributers; and I do hereby declare the following to be a full, clear, and exact description of the same, reference being had to the accompanying drawings, forming a part of this specification, and to the letters of reference marked thereon.

The present invention relates to improvements in cotton-planters and for fertilizer-distributers of the type illustrated in my prior patent, No. 633,934, dated September 26, 1899.

The primary object of the present invention is to provide a structure with which the seed may be planted in drills or spaced in hills, as desired.

A further object of the invention is to provide a structure with which the furrow is first opened and subsequently, but before the seed is dropped into the same, smoothed and made regular both for the reception of the seed and in order to enable the seed to be clearly seen in the furrow prior to being covered, thus enabling the farmer to determine with certainty whether the seed is being properly dropped.

The invention consists in certain novel details of construction and combinations and arrangements of parts, all as will be hereinafter described, and pointed out particularly in the appended claims.

Referring to the accompanying drawings, Figure 1 is a side elevation, slightly in perspective, of a planter and distributer embodying the present improvements. Fig. 2 is a view at right angles to Fig. 1 and showing the hopper on an enlarged scale. Fig. 3 is a detailed section longitudinally of the axis of the hopper, and Fig. 4 is a detail section at right angles to Fig. 3. Fig. 5 is a detail perspective view of the furrow-smoother.

Similar letters of reference in the several figures indicate like parts.

In said drawings, A indicates the beam, B the plow-handle, and C the standard, said parts being, if desired, of any ordinary or preferred construction, although the plow-point D is preferably an opener or so shaped as to form a uniform and regular furrow-opening the sides of which are subsequently smoothed down for the reception of the seed, and the earth finally drawn in over the seed to form a regular and well-defined ridge, as will be hereinafter described. Extending back from the standard and connected with the beam by braces F is a bifurcated frame G, the arms of which are preferably connected at their rear ends by a cross-brace $f$, and also carry the covering-blades H. The latter extend inwardly and downwardly in position to throw the earth from the sides of the furrow inwardly and ridge the same up over the seed previously deposited in the furrow from a hopper journaled in the frame between the standard and covering-blades. The hopper itself is mounted on a cross-axle I, journaled in suitable bearings in the bifurcated frame, and consists, essentially, of two bell-shaped sections K K', one of which is preferably rigidly mounted on the shaft and the other of which is adjustably mounted thereon, as by a set-screw $k$, so as to be readily moved toward and from the first-mentioned section to vary the width of the opening between the sections, and thereby regulate the quantity of seed or fertilizer which will be allowed to pass out of the hopper into the furrow. Where it is desired to plant the seed in a drill, the opening between the sections of the hopper is made in the form of a continuous opening; but where it is desired to space or drop the seed at regular intervals the opening between the sections of the hopper is not a continuous opening, but is closed for distances equal to the desired spaces between the hills, and it is one of the objects of the present invention to provide a single apparatus with which the seed may be planted in either way without requiring the farmer to employ two different planters. In the simplest embodiment the adjacent edges of the bell-shaped sections of the hopper are provided with flanges or projections O, extending toward each other and forming annular seats for the reception of a removable seed-ring P. The latter is preferably V-shaped or curved in cross-section, as shown, and formed of a strip of metal, the ends of which are detachably connected together, as by a hook connection $p$, whereby it may be placed in position by first separating the hopper-sections, then passing the ring into position and hooking its ends together, when by bringing the sections toward each other again the seed-ring will be clamped firmly in place between the hopper-sections and outside of the before-mentioned flanges or projections.

The seed-ring, it will be observed, is a simple inexpensive contrivance, and it may be provided with holes or apertures suitably spaced apart for the escape of seed and fertilizer, and, if desired, said holes or apertures (indicated at Q) may be provided with slide-covers q, whereby they may be wholly or partly closed, as, for instance, where it is desired to space the seed differently in the rows or where it is desired to close all the apertures for transporting the planter from one location to another. Obviously the shape of the seed-openings in the seed-ring is immaterial, and said openings may be rectangular, round, or oblong, as found most convenient for the particular seed being handled or planted. So, too, it is equally obvious that the seed-ring might be made integral with one of the hopper-sections and simply pass over or into the opposite section in such manner that a continuous opening would be left when the sections are spaced some distance apart and the openings in the ring closed by their covers, and hence I do not wish to be limited save where so specified to a removable seed-ring.

Immediately in rear of the plow-point D and preferably attached to the rear side of the standard C is a furrow-smoother R, which furrow-smoother is provided with retreating or backwardly-inclined surfaces r, adapted to contact with the earth at the sides of the furrow to press and smooth the same downwardly and outwardly, thereby forming a perfectly-smooth channel in which the seed and fertilizer will be deposited and in which they may be readily seen by the farmer after the hopper has passed, but before the covering-blades act to draw the earth from the sides of the furrow in over the seed. The upper corners of the furrow-smoother may be curved to form sod and trash clearers, as at r', although ordinarily the smoothing action of this device will answer all requirements.

In practice it is desirable that the interior of the hopper shall be smooth or free from obstructions, such as would tend to clog the free movement of the seed in the hopper, and it is further desirable that the seed-openings should be located in such position that the pressure of the seed in the hopper will always tend to move the seed toward the openings. Hence the side walls of the hopper slope sharply toward the center or line of the seed-openings, and where a seed-ring is employed the seed-ring itself forms a continuation of the inner sloping walls of the hopper-sections. With this construction the seed being tumbled over and over in the hopper is always deflected by the side walls toward the seed-openings, thereby insuring a regularity in the planting operation, even though but a small quantity of seed remains in the hopper.

In operation it is designed that the two hopper-sections shall rest on the edges of the furrow, while their meeting edges shall pass down into the furrow to a point in proximity to the bottom thereof. For this reason the seed-hopper sections are made bell-shaped, so that a firm bearing may be secured on the edges of the furrow to insure the rotation of the hopper and at the same time the formation of the furrow-walls will not be destroyed nor will the earth be pressed up into the seed-opening, as might be the case if the hopper-sections were not formed with the bell-shaped or outwardly-flaring edges which pass down into the furrow and tend to maintain the formation of the latter.

While it is preferred that the hopper shall derive its motion entirely through contact with the earth on each side of the furrow, yet it is obvious that other appliances well known in the art might be employed for rotating the hopper, and hence I do not wish to be limited, save where so specified, to the particular exterior conformation of the hopper-sections.

Having thus described my invention, what I claim as new, and desire to secure by Letters Patent, is—

1. In a planter or distributer such as described, the combination with a frame, an axle journaled therein, a hopper mounted on the axle and formed of bell-shaped sections movable toward and from each other on the axle, a seed-ring between said sections and having seed-openings therein and means for securing the sections on the axle in fixed position with relation to each other.

2. In a planter or distributer such as described, the combination with a frame, an axle journaled therein, a hopper mounted on the axle and formed of bell-shaped sections movable toward and from each other on the axle, a seed-ring between said sections having seed-openings therein, means for closing said openings and means for securing the sections on the axle in fixed position with relation to each other.

3. In a planter or distributer such as described, the combination with the frame, the furrow-opener at the front of said frame, the covering-blades at the rear of said frame and the axle journaled in the frame between the furrow-opener and covering-blades, of the hopper mounted on the axle and formed of bell-shaped sections adjustable toward and from each other and having flanges or projections on their proximate faces, a removable seed-ring supported between said sections on the flanges or projections having seed-openings therein, and means for securing the hopper-sections in fixed relation to each other on the axle.

4. In a planter or distributer such as described, the combination with the frame, the axle journaled in the frame, the hopper mounted on the axle and formed of separate bell-shaped sections movable toward and from each other and having oppositely-projecting flanges or projections on their proximate faces, of a movable seed-ring having apertures therein and formed of a strip with its ends detachably connected together, said seed-ring being mounted between the hopper-sections on the flanges or projections and means for securing the hopper-sections in fixed position with relation to each other to retain the seed-ring in place.

5. In a planter or distributer such as described, the combination with the frame carrying a plow or furrow-opener and covering-blades, an axle journaled in the frame and a hopper formed of sections with their proximate edges sloping outwardly or away from the axle, of a seed-ring between said sections and having seed-apertures therein, said seed-ring being formed with sloping walls whereby the seed within the hopper will be constantly deflected laterally toward the plane of the seed-openings.

6. In a planter or distributer such as described, the combination with the frame, the axle journaled in the frame and the hopper formed of sections mounted on the frame and adjustable toward and from each other, of a seed-ring held between the proximate edges of the sections, said seed-ring being curved outwardly or substantially V-shaped in cross-section and having seed-openings therein; substantially as described.

7. In a planter such as described, the combination with the frame the plow-point or furrow-opener at the front end of the frame, the covering-blades at the rear end of the frame and the hopper journaled in the frame at an intermediate point for dropping the seed into the furrow between the opener and covering-blades, and a furrow-smoother having reversely-inclined smoothing-surfaces located on the frame in rear of the opener and in front of the hopper.

8. In a planter or distributer such as described, the combination with the frame, furrow-opener, covering-blades and a hopper formed of bell-shaped sections adapted to run in said furrow, of a furrow-smoother adapted to extend down into the furrow, said smoother being located in rear of the opener but in advance of the hopper and having reversely-inclined smoothing-surfaces for smoothing the side walls of the furrow; substantially as described.

HENRY D. WILSON.

Witnesses:
M. E. NUSSBAUM,
C. T. DICKENSON.